April 13, 1954 — W. A. MEIGHAN — 2,675,262

METHOD OF AND CHOKER ASSEMBLY FOR BUNDLING LOGS

Filed March 19, 1949 — 3 Sheets-Sheet 1

INVENTOR.
William A. Meighan
BY
Atty.

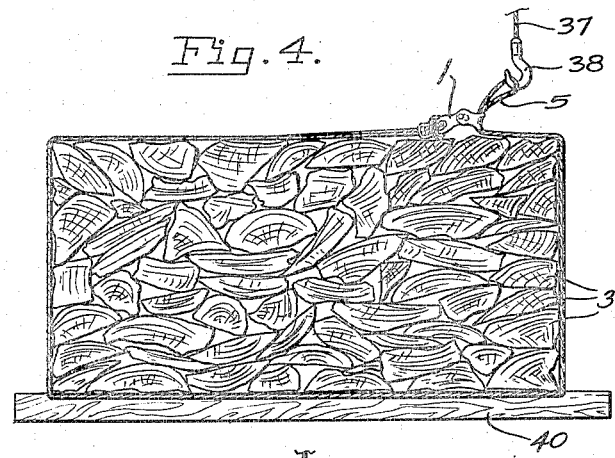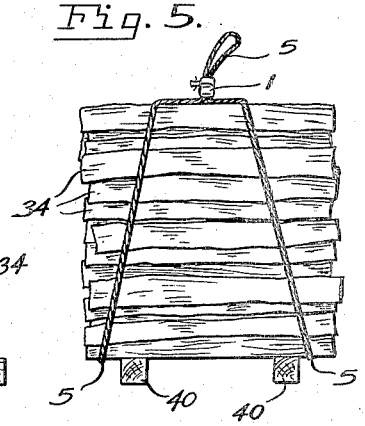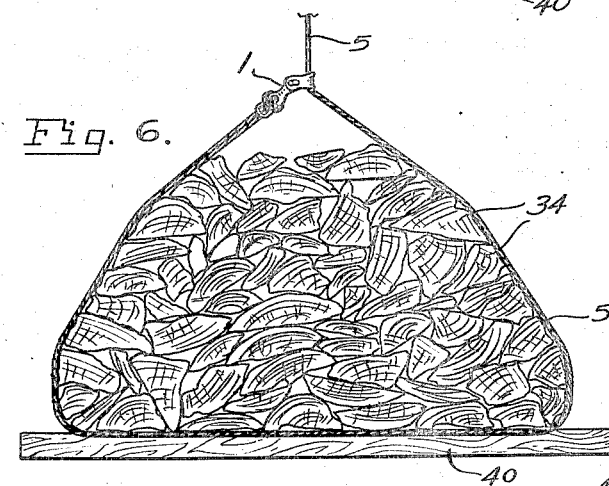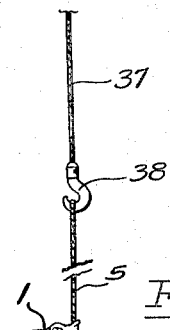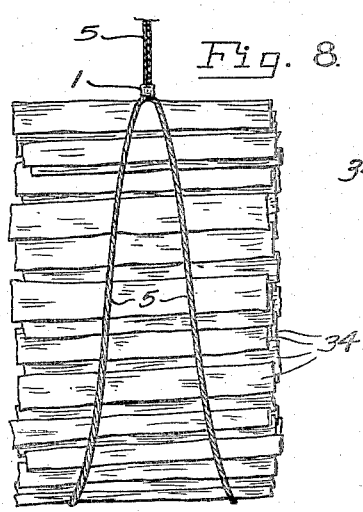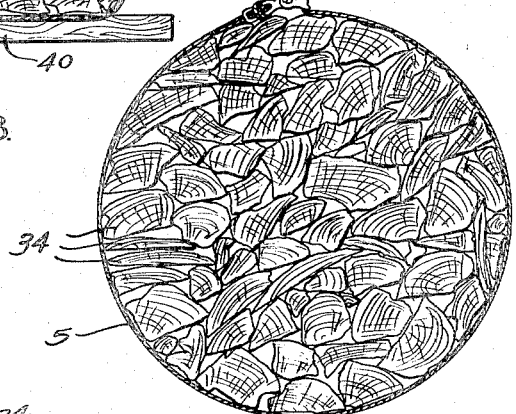

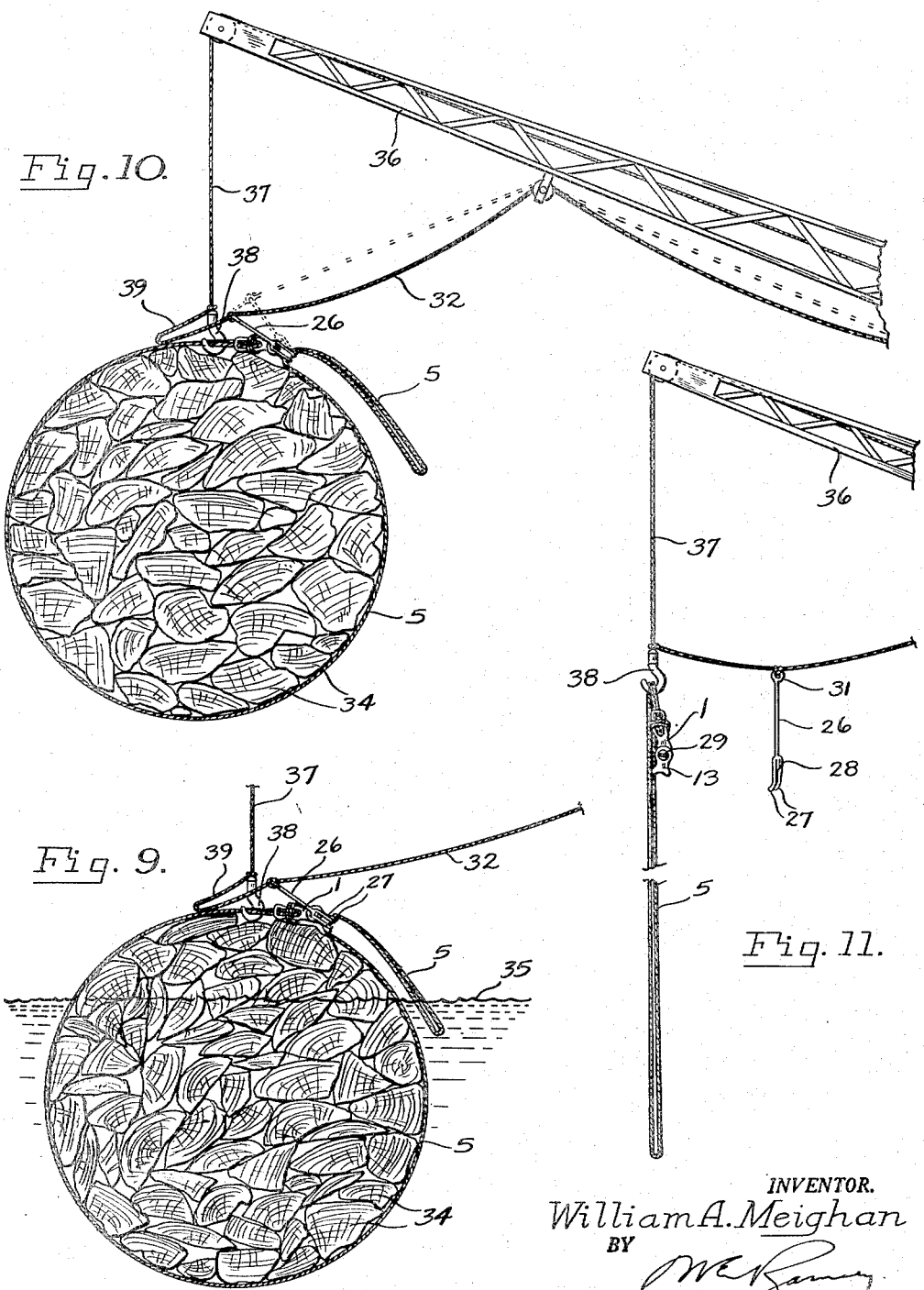

Patented Apr. 13, 1954

2,675,262

UNITED STATES PATENT OFFICE 2,675,262

METHOD OF AND CHOKER ASSEMBLY FOR BUNDLING LOGS

William Arthur Meighan, Oswego, Oreg.

Application March 19, 1949, Serial No. 82,375

13 Claims. (Cl. 294—75)

My invention pertains to the art of bundling logs, and relates particularly to a novel method of and means for securing a bundle of logs detachably for transport from the logging site to the processing mills.

In the logging industry, for example, choker ropes have long been used to dray cut timber from the forest to a waterway or other convenient site from which the logs are transported to the mill. The ropes employed are necessarily large in cross-section, and are usually constructed of a number of wires woven into the form of a heavy cable to provide the strength required for such uses. These cables are accordingly stiff and resistant to bending, thus causing considerable difficulty in the formation of knots therein or in otherwise manipulating them during attachment to such devices as terminal fittings and choker hooks. This difficulty has heretofore been avoided by attaching closed loops or ferrules to the end of the rope by means of clamps, solder, babbit, etc., which loops or ferrules served as means for attaching the end of the rope to a hook or other device slidably mounted on the rope. Not only does this procedure necessitate the use of special equipment which must be available at the logging site, but the fastening means thus provided does not afford a positive grip for securing and holding the timbers or logs in a tight bundle.

This latter disadvantage is of particular concern in present day logging operations. With the sharp decline in the quantity of available timber it has become necessary to salvage cordwood, pulp logs, second growth timber and water-soaked lengths, and other wood of relatively short lengths, which are of use in the manufacture of paper pulp, cardboard and other commodities made from ground or defibered wood. Economic factors prohibit the handling of such wood in individual pieces, and the choker ropes heretofore employed are incapable of securing and maintaining a bundle of such logs in compact form during the logging and freighting operations. This is because the choker ropes maintain a relatively strong hold on the logs only while sufficient tension is maintained upon the dragline extending from the choker loop. Also, when a bundle of logs is being dragged over the ground, any relaxation in the tension of the line immediately loosens the grip of the choker and some of the logs may slip away from the bundle, or the latter may otherwise be disarranged. However, even if the bundle of logs is successfully hauled from the forest to the site where the logs are to be loaded onto freight cars or onto logging trucks, or into a waterway for subsequent transport, the hold on the bundle is relaxed when the dragline is removed.

I have previously overcome the difficulty recited above by means of a novel choker described and claimed in my co-pending application, Serial No. 21,825, filed April 19, 1948, and entitled Bundling Choker. Said choker, over which the present invention is an improvement, provides means by which a bundle of logs may be secured releasably with a single encompassing rope such as a wire cable. With a bundle of logs of short length it is necessary to place the single rope accurately therearound in order to insure against lateral displacement and subsequent loss of the load. Loss of the load sometimes occurs, however, even with a properly placed rope, particularly when the load strikes against some object during loading and unloading. This occurs because the single rope does not provide the desired degree of lateral stability.

It is a principal object of my invention, therefore, to provide a choker assembly in which a double rope is secured detachably about a bundle of logs, the separate loops of said double rope being spaced apart about said bundle to insure lateral stability of the latter.

Another important object of my invention is the provision of a novel method of bundling and handling logs whereby lateral stability of said bundle is maintained at all times during transport.

A further object is the provision of means incorporated with the choker hook for effecting the release of a rope from about a bundle of logs from a remote position with safety of the operator.

These and other objects and advantages of my invention will appear from the following detailed description taken in connection with the accompanying drawings, in which:

Fig. 4 is a side elevation of a pile of logs and showing the manner in which a bundling choker is applied thereto preliminary to forming a bundle of said legs in accordance with the method embodying my invention;

Fig. 5 is an end view of the structure shown in Fig. 4;

Fig. 6 is a side elevation illustrating an intermediate position of formation of the bundle as started in Fig. 4;

Fig. 7 is a side elevation showing the completed bundle as formed from the stepwise procedure illustrated in Figs. 4 and 6;

Fig. 8 is an end view of the bundle shown in Fig. 7;

Fig. 9 is a side elevation showing the bundle of Fig. 7 deposited in a waterway and ready for hoisting therefrom;

Fig. 10 is a side elevation showing the bundle of Fig. 9 suspended from a hoisting cable, the bundle releasing mechanism being shown in releasing position in dotted lines; and Fig. 11 is an elevation showing the position of the bundling choker and releasing mechanism immediately after release of the bundle shown in Fig. 10.

Figure 2:
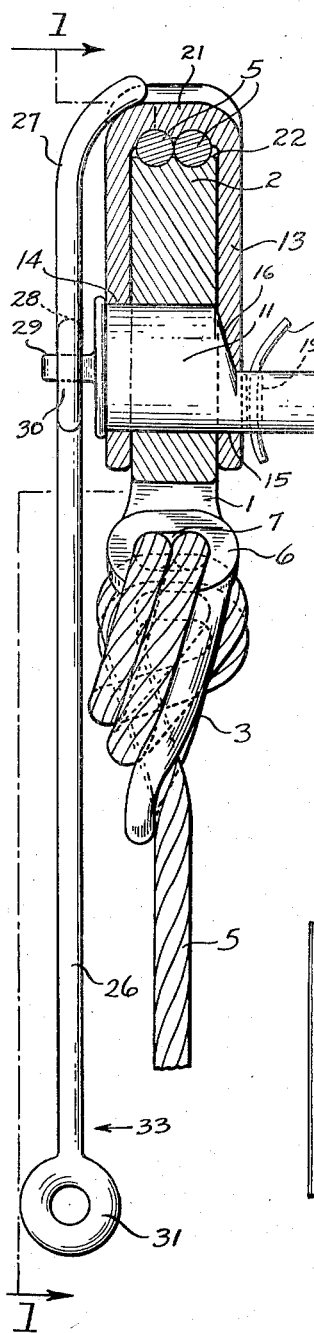
Fig. 2 is a side elevation, partly in section, taken along the line 2—2 in Fig. 1.

A bundling choker embodying my present invention is similar in general design to the choker illustrated and claimed in the application referred to hereinbefore, with the exception that provision is made for coupling a double rope thereto. An integral body 1 defines a clamping member 2 at one end thereof, and an offset coupling member 3 at the opposite end. The coupling member illustrated is substantially V-shaped in side elevation as shown in Fig. 2. The lower portion thereof, that is, the portion adjacent the clamping member is offset rearwardly from the plane of the clamp, while the upper or terminal end of the coupling member is bent forwardly to incline over the lower portion. A central portion of the coupling member adjacent the clamping member is recessed, defining an aperture 4, through which the double lines 5 are threaded for attachment to the coupling.

Formed in the side sections adjacent said aperture 4 and projecting normally from the plane of the body 1 are a pair of spaced tunnels or eyes 6, defining axially aligned bores 7 for receiving the lines to be anchored. The upper or terminal portion of the coupling member overlying the lower portion is also provided with an eye 8 arranged centrally therein. A groove 9 is formed in one of the edges of said upper portion, adjacent one tunnel 6 to provide a guide channel in which one portion of the line 5 may be laid.

In attaching the line 5 to the coupling member, the ends of the line are threaded through eye 8 and then rearwardly through aperture 4. The lines are then flexed upwardly to lie in the groove 9 and to wrap around the coupling in back of the line, emerging from eye 8 to rest in the apex of the V formed by the upper and lower portions of the coupling member. The lines are then threaded through the pair of tunnels 6 within the loop formed by the lines passing upwardly through eye 8. This type of knot and the procedure for forming it is more fully described in U. S. Letters Patent No. 2,240,510 issued to me on May 6, 1941, and entitled Logging Choker and Fittings Therefor, in which patent the general form of the above discussed coupling is fully described and claimed. Said coupling is disclosed herein as being a preferred type of fitting, although not critical to the proper operation of a choker assembly embodying my present invention. Such other well known fittings as, for example, a closed eye, loop and hook, or ferrule-type connection may readily be adapted for use with the assembly of the present invention, provided one of the connecting parts be formed integrally with the clamping member 2 previously mentioned.

The clamping member 2 is offset at an oblique angle to the longitudinal axis of the elongated coupling member 3 and an elongated pin 12 cooperates therewith. Thus, a transverse hole 10 is formed in the rearward portion of the clamping member adjacent the coupling member, said hole being of sufficient diameter to receive the enlarged end 11 of the aforementioned elongated pin 12, the function of which is explained hereinafter. A U-shaped cam member 13 is provided at one of its free ends with an elongated slot 14, and at the other of its free ends with a bore 15. The bore is tapered outwardly toward its inner end to provide a seat for the sloping face 16 joining the enlarged end 11 to the reduced end 17 of the elongated pin 12.

The clamping member 2 is placed in the slot formed by the U-shaped cam 13, and the pin 12 is inserted transversely through the elongated slot 14, the hole 10 and the hole 15, to secure the clamp pivotally therein. The reduced end 17 of the pin 12 terminates in an enlargement at its end to form a shoulder 18, which prevents the pin from being separated from the cam 13. A hole 19 is drilled transversely through the reduced end of the pin at a position adjacent the outer face of the cam 13 when the pin is in fully locking position, as shown in Fig. 2 of the drawings, to receive a wire 20, or other keeper, such as a cotter pin. This wire insures against accidental displacement of the pin by preventing the enlarged end of the pin from moving out of the hole 10. In choker assemblies for use with light ropes the pin 12 may be merely tapered, rather than stepped, as heretofore described, and the holes provided in the flanges may be constructed to correspond to the dimensions of the pin.

Figure 3:
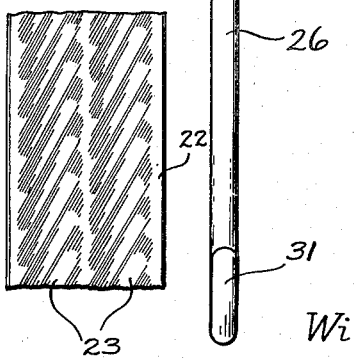
Fig. 3 is a fragmentary plan view of the engaging face of the clamp shoe, as viewed in the direction of arrow 3 in Fig. 1.

The closed end of the cam member 13 is formed in the shape of a saddle 21 which faces and cooperates with the curved, convex shoe 22 formed at the end of the offset clamping member 2, for releasably gripping an intermediate section of the choker ropes 5, one end of which is secured to the coupling member 3. The shoe 22 formed at the end of the coupling member 2 is concave across its face. As shown in Fig. 3 of the drawings, the shoe face may be imprinted with the design of the convolutions of strands comprising a double cable or rope, thereby effecting greater gripping action. That is, the shoe face may have formed therein a pair of intaglio representations 23 of the peripheral surfaces of the wire rope. The inner surface of the saddle is curved sharply outward at its receiving end 24 for purposes presently to be explained.

In the operation of the choker assembly hereinabove described, the terminal ends of the double choker rope 5 are secured to the coupling member 3 in the manner before discussed, and the rope is looped about the log or bundle of logs or other articles to be handled. With the pin 12 in locking position and the wire keeper 20 affixed as shown in Fig. 2, the cam member 13 is rotated away from the shoe 22 sufficiently to introduce an intermediate section of the double rope into saddle 21. The free end of the rope, which has been provided with a terminal fitting, such as the type disclosed and claimed in the United States patent referred to hereinbefore, is then secured to a dragline. As the dragline exerts a pull upon the choker rope, the latter slides freely through the saddle 21 in the direction of arrow 25, thereby decreasing the diameter of the choker loop encompassing the bundle.

When the articles are brought into such a compact bundle as to prevent further closing of the choker loop, the outward pressure exerted by the bundle upon the rope overlying the receiving end 24 of the saddle, and upon the coupling member 3, tends to force the saddle cam 13 into axial alignment with the longitudinal axis of the coupling. By this movement the rope is gripped frictionally between the saddle and the shoe 22 and the bundle is retained in compact form. However, the pressure exerted by the bundle upon the rope overlying the sharply curved receiving end 24 of the saddle produces a sharp but not shearing bend in the rope which fits closely against the saddle. It has been discovered that this close union at the sharp bend greatly increases the holding power of the clamp.

Logs, for example, thus tightly bundled may thereafter be hauled from the forest to the shipping site, and the dragline released. Since the outward pressure of the bundle maintains the clamp in positive gripping position, it is apparent that no tension need be maintained upon the free end of the choker rope. The bundle thus formed may be loaded upon trucks or freight cars, or discharged into a waterway to be floated in a bundle to the mill for processing.

I have also provided means for releasing the grip of the clamping member upon the rope 5 from a remote position in order to insure the safety of the operator during unloading of the logs, and also to accommodate said unloading from positions normally out of reach of the operator. Said means comprises a lever 26 having spaced elongated fingers 27 projecting from one end thereof. Said fingers are curved at their ends to engage the underside of the saddle 21. A stub finger 28 extends parallel to and intermediate the elongated fingers 27. Projecting outwardly from the enlarged end 11 of the pin 12 is a flat flange 29. A hole 30 is formed transversely through the center of said flange. The stub finger 28 is proportioned and arranged to be received in the hole 30 formed in the flange 29, while the elongated fingers 27 lie adjacent the outer edges of said flange. The lever 26 is thus secured detachably intermediate its ends to the pin 12 by means of the stub finger 28.

The terminal end of lever 26 opposite the fingers 28 is provided with an eyelet 31 for securing a trip line 32 thereto. Thus, by pulling on the trip line, the lever 26 is moved in the direction of arrow 33 in Fig. 2, with the ends of fingers 27 functioning as a fulcrum. This movement causes the enlarged end 11 of pin 12 to be pulled longitudinally outwardly from engagement with the transverse hole 10. The saddle 21 and shoe 22 spring apart immediately to release the grip on the rope 5, whereupon the latter slides from the clamping member and the bundle of logs or other articles is discharged.

In Figs. 9, 10 and 11, I have shown a bundle of logs 34 being lifted from a waterway 35 by means of a crane 36. The hoisting cable 37 of said crane is provided at its end with a hook 38 which is slipped under the bundling rope 5 adjacent the choker hook 1. One end of the trip line 32 is tied to the cable 37 adjacent the hook 38. The trip line is also secured to the eyelet 31 of the lever 26 adjacent the end tied to the hoisting cable. The slack length 39 of the trip line provided between the eyelet 31 and cable 37 permits sufficient movement of lever 26 to pull out the pin 12.

The preferred method of bundling logs, as embodied in my invention, will now be explained in connection with the operation of the bundling choker described hereinbefore. Short lengths of logs, pulpwood or cordwood 34 are stacked in a rectangular pile upon spaced blocks 40. With the terminal ends of the double rope 5 secured to the coupling member 3 as described hereinbefore, the intermediate sections of rope are separated and wrapped about the pile of logs to underlie the latter adjacent the outer sides of the blocks 40, as shown in Figs. 4 and 5 of the drawings. The doubled or looped end of the rope is then drawn through the opening between the saddle 21 and shoe 22 of the clamping member 2.

Figure 1:
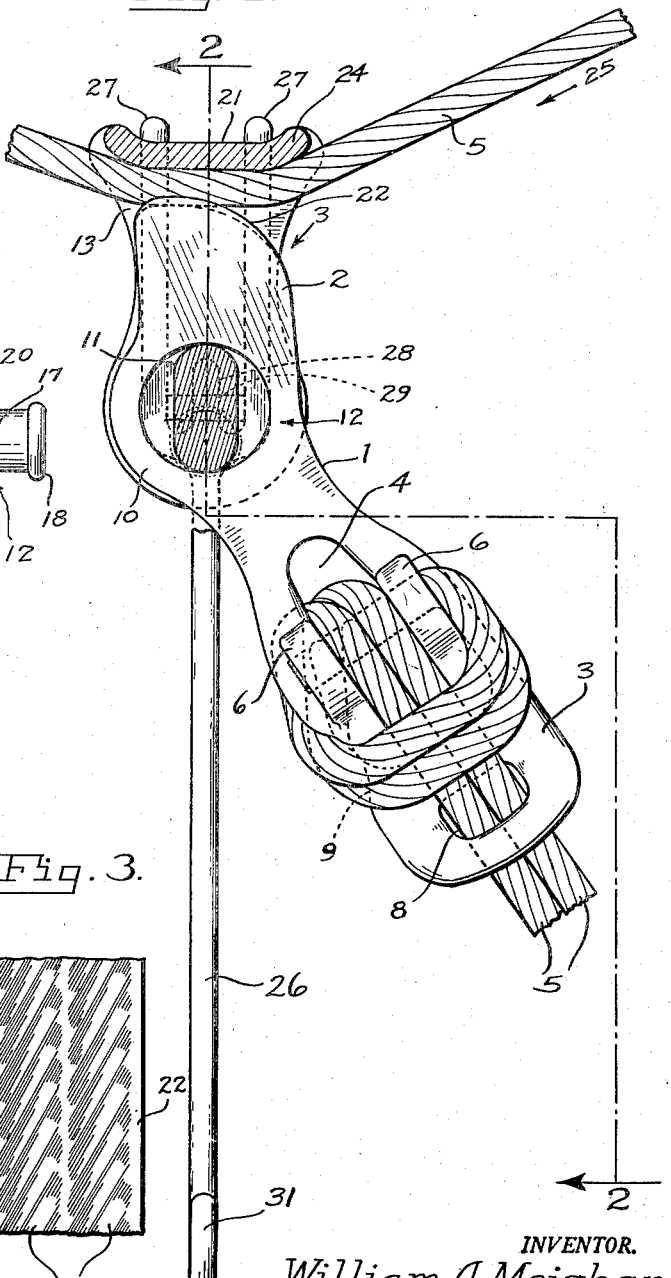
Fig. 1 is a front elevation of a choker hook embodying the features of my invention, parts thereof being shown in section to illustrate details of construction, said view being taken along the line 1—1 in Fig. 2.

The hook 38 of the hoisting cable 37 is then inserted in the loop formed at the doubled end of the rope. As the cable 37 is pulled upwardly the rope 5 slides through the saddle 21 in the direction of arrow 25 in Fig. 1. The pile of logs is lifted and drawn together as the weight of said logs causes the rope to slide through the clamping member 2 and decrease the diameter of the loop formed by said rope, as shown in Fig. 6. When the logs have been lifted completely from the blocks 40 they are drawn together in a substantially circular bunch with the loop of rope 5 drawn tightly therearound, as shown in Figs. 7 and 8. The bundle or bunch thus formed may then be deposited upon a truck or freight car, or discarged into a waterway for transport to the processing mills. The outward pressure exerted by the logs causes the saddle 21 and shoe 22 to grip the rope securely and prevent loosening of the latter, as explained hereinbefore, and thus the bundle is held together after the hoisting hook 38 has been removed. The use of a double rope which encircles the bundle of logs adjacent therein provides stability sufficient to prevent inadvertent lateral slipping of the logs or lengths and the resultant collapse of the bundle, which frequently occurs when but one centrally arranged rope is employed.

When the bundle of logs has reached its destination, the hook 38 of the hoisting cable 37 is slipped under the rope 5 adjacent the coupling end of the choker hook 1. The lever 26 secured to the trip line 32 is attached to the pin 12 by inserting the stub finger 28 into the hole 30 of flange 29, with the elongated fingers 27 engaging the saddle 21 of the cam member 13. The wire keeper 20 is then removed, the cable is drawn in to raise the bundle above the ground, and the crane 36 manipulated to transport the bundle to the desired place for deposit. The crane operator then pulls on the trip line 32, whereupon the lever 26 is pivoted outwardly about the terminal ends of fingers 27 and the pin 12 is pulled out to disengage the clamping member 2 and the cam member 13 from the rope 5, as shown in dotted line in Fig. 10. The rope 5 slides freely through the opening between the saddle 21 and shoe 22 to release the bundle of logs. As shown in Fig. 11 of the drawings, the stub finger 28 disengages from the hole 30 provided in flange 29, to separate the lever 26 from the body of the choker hook when the pin 12 has been retracted.

I claim:

1. In a choker hook having coupling means at one end for securing a choker rope thereto, releasable jaw-like clamping members on the opposite end for receiving an intermediate section of said choker rope slidably therebetween, and a pin pivotally joining said clamping members together, said pin being movable laterally through said clamping members for varying the spacing between the gripping ends of said clamping members; means for moving said pin between engaging and disengaging positions, comprising a lever detachably pivoted intermediate its ends to one end of said pin, one end of said lever operatively engaging one of said clamping members and functioning as a fulcrum, whereby movement of the opposite end of said lever effects movement of the pin.

2. In a choker hook having coupling means on one end for securing a choker rope thereto, releasable jaw-like clamping members on the opposite end for receiving an intermediate section of said choker rope slidably therebetween, and a pin pivotally joining said clamping members together, said pin having a plurality of effective diameters and being movable laterally through said clamping members for varying the spacing between the gripping ends of said clamping members; means for moving said pin between engaging and disengaging positions, comprising a lever detachably pivoted intermediate its ends to the enlarged end of said pin, one end of said lever operatively engaging one of said clamping members and functioning as a fulcrum, whereby movement of the opposite end of said lever effects movement of the pin.

3. A choker assembly comprising a choker hook having rope coupling means at one end thereof and releasable jaw-like clamping members at the opposite end, a choker rope having two separable strands, one end of each strand being secured to the coupling means of said choker hook, the opposite end of said rope forming a closed loop, and a pin pivotally joining said clamping members together, said pin being movable laterally through said clamping members for varying the spacing between the gripping ends of said clamping members, said clamping members being proportioned and arranged to permit sliding movement of the choker rope in the direction for decreasing the size of the choker loop and to resist movement of the choker rope in the direction for enlarging the choker loop when said clamping members are in clamping position, and to permit sliding movement in both directions when in retracted position, the strands of said rope adjacent the looped end being receivable slidably in the space between said clamping members whereby said rope forms a pair of closed choker loops for encircling logs and other articles of similar dimensions to be bundled, said strands being separable intermediate their ends for positioning adjacent opposite lateral sides of said bundle to provide stability therefor.

4. A choker assembly comprising a choker hook having rope coupling means at one end thereof and releasable jaw-like clamping members at the opposite end, a doubled choker rope forming two separable strands, one end of each strand being secured to the coupling means of said choker hook, the opposite end of said rope forming a closed loop, and a pin pivotally joining said clamping members together, said pin being movable laterally through said clamping members for varying the spacing between the gripping ends of said clamping members, the strands of said rope adjacent the looped ends being receivable slidably in the space between said clamping members, whereby said rope forms a pair of closed choker loops for encircling logs and other articles of similar dimension to be bundled, said strands being separable intermediate their ends for positioning adjacent opposite lateral sides of said bundle to provide stability therefor.

5. A choker assembly comprising a choker hook having rope coupling means at one end thereof and releasable jaw-like clamping members at the opposite end, a choker rope having two separable strands, one end of each strand being secured to the coupling means of said choker hook, the opposite end of said rope forming a closed loop, a pin pivotally joining said clamping members together, said pin being movable laterally to said clamping members for varying the spacing between the gripping ends of said clamping members, and a lever detachably pivoted intermediate its ends to one end of said pin, one end of said lever operatively engaging one of said clamping members and functioning as a fulcrum, whereby movement of the opposite end of said lever effects movement of the pin, said clamping members being proportioned and arranged to permit sliding movement of the choker rope in the direction for decreasing the size of the choker loop and to resist movement of the choker rope in the direction for enlarging the choker loop when said clamping members are in clamping position, and to permit sliding movement in both directions when in retracted position, the strands of said rope adjacent the loop end being receivable slidably in the space between said clamping members, whereby said rope forms a pair of closed choker loops for encircling logs and other articles of similar dimension to be bundled, said strands being separable intermediate their ends for positioning adjacent opposite lateral sides of said bundle to provide stability therefor.

6. A choker assembly comprising a choker hook having rope coupling means at one end thereof and releasable jaw-like clamping members at the opposite end, a choker rope having two separable strands, one end of each strand being secured to the coupling means of said choker hook, the opposite end of said rope forming a closed loop, a pin pivotally joining said clamping members together, said pin having a plurality of effective diameters and being movable laterally through said clamping members for varying the spacing between the gripping ends of said clamping members, and a lever detachably pivoted intermediate its ends to the enlarged end of said pin, one end of said lever operatively engaging one of said clamping members and functioning as a fulcrum, whereby movement of the opposite end of said lever effects movement of the pin, the said strands of said rope adjacent the looped end being receivable slidably in the space between said clamping members whereby said rope forms a pair of closed choker loops for encircling logs and other articles of similar dimensions to be bundled, said strands being separable intermediate their ends for positioning adjacent opposite lateral sides of said bundle to provide stability therefor.

7. A choker assembly comprising a choker hook having rope coupling means at one end thereof and releasable jaw-like clamping members at the opposite end, a doubled choker rope forming two separable strands, one end of each strand being secured to the coupling means of said choker hook, the opposite end of said rope forming a closed loop, a pin pivotally joining said clamping members together, said pin being movable laterally through said clamping members for varying the spacing between the gripping ends of said clamping members, a lever detachably pivoted intermediate its ends to one end of said pin, one end of said lever operatively engaging one of said clamping members and functioning as a fulcrum, whereby movement of the opposite end of said lever effects movement of the pin, the strands of said rope adjacent the looped end being receivable slidably in the space between said clamping members whereby said rope forms a pair of closed choker loops for encircling logs and other articles of similar dimensions to be bundled, said strands being separable intermediate their ends for positioning adjacent opposite lateral sides of said bundle to provide stability therefor, and rope means secured to the free end of said lever for actuating the latter from a position remote from said choker hook.

8. A choker assembly comprising a choker hook having rope coupling means at one end thereof and releasable jaw-like clamping members at the opposite end, a choker rope having two separable strands, one end of each strand being secured to the coupling means of said choker hook, the opposite end of said rope forming a closed loop, a pin pivotally joining said clamping members together, said pin having a plurality of effective diameters and being movable laterally through said clamping members for varying the spacing between the gripping ends of said clamping members, a lever detachably pivoted intermediate its ends to the enlarged end of said pin, one end of said lever operatively engaging one of said clamping members and functioning as a fulcrum, whereby movement of the opposite end of said lever effects movement of the pin, said clamping members being proportioned and arranged to permit sliding movement of the choker rope in the direction for decreasing the size of the choker loop and to resist movement of the choker rope in the direction for enlarging the choker loop when said clamping members are in clamping position, and to permit sliding movement in both directions when in retracted position, the strands of said rope adjacent the loop end being receivable slidably in the space between said clamping members, whereby said rope forms a pair of closed choker loops for encircling logs and other articles of similar dimensions to be bundled, said strands being separable intermediate their ends for positioning adjacent opposite lateral sides of said bundle to provide stability therefor, and rope means secured to the free end of said lever for actuating the latter from a position remote from said choker hook.

9. A method of bundling logs and other articles of similar dimensions, comprising forming a stack of said articles, providing a rope having two laterally separable lengths forming a closed loop at one end thereof, providing a choker hook having rope coupling means at one end and releasable jaw-like rope clamping members at the opposite end, securing the free end of each length of rope to said coupling means, encircling the stack of articles with said rope, arranging the looped end of said rope between the clamping members, positioning the lengths of said rope intermediate the ends thereof adjacent opposite lateral sides of said stack to provide stability therefor, and raising the encircled stack by the looped end of said rope and utilizing the weight of said stack for drawing the rope through the space between said clamping members to decrease the diameter of said encircling rope and form a compact bunch or bundle of said articles.

10. A method of bundling logs, comprising forming a stack of said logs, providing a double rope having two laterally separable lengths forming a closed loop at one end thereof, providing a choker hook having rope coupling means at one end and releasable jaw-like rope clamping members at the opposite end, securing the free end of each length of rope to said coupling, encircling the stack of logs with said rope, arranging the looped end of said rope between the clamping members, positioning the lengths of said rope intermediate the ends thereof adjacent opposite lateral sides of said stack to provide stability therefor, tensioning the rope and compacting the encircled stack by pulling on the looped end of the rope, and raising the stack by means of the rope while utilizing the weight of said stack to maintain the tension and to retain a compact bunch or bundle of said logs.

11. A method of bundling and handling logs and other articles of similar dimensions, comprising forming a stack of said articles, providing a rope having two laterally separable lengths forming a closed loop at one end thereof, providing a choker hook having rope coupling means at one end and releasable jaw-like rope clamping means at the opposite end, securing the free end of each length of rope to said coupling means, encircling the stack of articles with said rope, arranging the looped end of said rope between the clamping members, positioning the lengths of said rope intermediate the ends thereof adjacent opposite lateral sides of said stack to provide stability therefor, raising the encircled stack by the looped end of said rope and utilizing the weight of said stack for drawing the rope through the space between said clamping members to decrease the diameter of said encircling rope and form a compact bunch or bundle of said articles, depositing said bundle upon a carrier for transport, and utilizing the outward pressure exerted by said articles to draw said clamping members into positive engagement with said rope to prevent release of the latter during transport.

12. A method of bundling and handling logs and other articles of similar dimensions, comprising forming a stack of said articles, providing a rope having two laterally separable lengths forming a closed loop at one end thereof, providing a choker hook having rope coupling means at one end and releasable jaw-like rope clamping means at the opposite end, securing the free end of each length of rope to said coupling means, encircling the stack of articles with said rope, arranging the looped end of said rope between the clamping members, positioning the lengths of said rope intermediate the ends thereof adjacent opposite lateral sides of said stack to provide stability therefor, raising the encircled stack by the looped end of said rope and utilizing the weight of said stack for drawing the rope through the space between said clamping members to decrease the diameter of said encircling rope and form a compact bunch or bundle of said articles, depositing said bundle upon a carrier for transport, utilizing the outward pressure exerted by said articles to draw said clamping members into positive engagement with said rope to prevent release of the latter during transport, engaging hoisting means under said rope adjacent said choker hook, elevating said bundle by said hoisting means, releasing the grip of said clamping members on said rope, and utilizing the weight of said articles to disengage the rope from said clamping members and release the load.

13. A method of bundling and handling logs, comprising forming a stack of said logs, providing a rope having two laterally separable lengths forming a closed loop at one end thereof, providing a choker hook having rope coupling means at one end and releasable jaw-like rope clamping means members at the opposite end, securing the free end of each length of rope to said coupling means, encircling the stack of logs with said rope, arranging the looped end of said rope between the clamping members, positioning the lengths of said rope intermediate the ends thereof adjacent opposite lateral sides of said stack to provide stability therefor, raising the encircled stack by the looped end of said rope and utilizing the weight of said stack for drawing the rope through the space between said clamping members to decrease the diameter of said encircling rope and form a compact bunch or bundle of said logs, depositing said bundles upon a carrier for transport, utilizing the outward pressure exerted by said logs to draw said clamping members into positive engagement with said rope to prevent release of the latter during transport, engaging hoisting means under said rope adjacent the choker hook, elevating said bundle by said hoisting means, releasing the grip of said clamping members on said rope, and utilizing the weight of said logs to disengage the rope from said clamping members and release the load.

References Cited in the file of this patent

UNITED STATES PATENTS

| Number | Name | Date |
| --- | --- | --- |
| 82,570 | Van Sickle | Sept. 29, 1868 |
| 393,940 | Toney | Dec. 4, 1888 |
| 573,248 | Thompson | Dec. 15, 1896 |
| 607,679 | Cancienne | July 19, 1898 |
| 839,036 | Roberts | Dec. 18, 1906 |
| 1,100,552 | Galloway | June 16, 1914 |
| 1,427,724 | Clay | Aug. 29, 1922 |
| 2,024,222 | Hinchman | Dec. 17, 1935 |
| 2,584,371 | Shackel | Feb. 5, 1952 |

FOREIGN PATENTS

| Number | Country | Date |
| --- | --- | --- |
| 329,439 | Great Britain | May 22, 1930 |